United States Patent Office
3,224,623
Patented Dec. 21, 1965

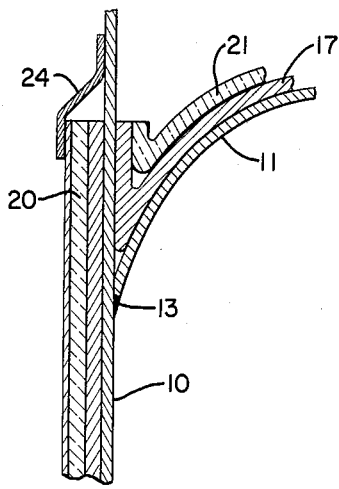
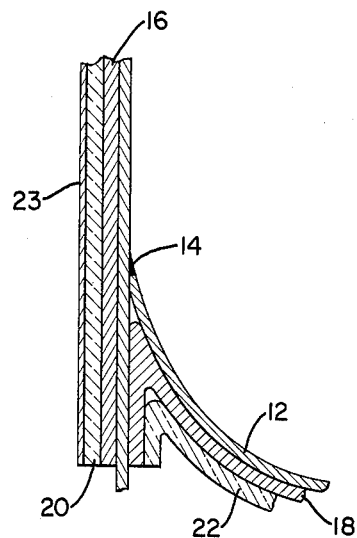

3,224,623
LIQUEFIED GAS CONTAINER INSULATION
Paul M. Knox, Jr., Golden, and Jay L. McGrew, Denver, Colo., assignors to Martin-Marietta Corporation, Baltimore, Md., a corporation of Maryland
Filed May 20, 1963, Ser. No. 281,603
5 Claims. (Cl. 220—9)

This invention relates to thermal insulation for vessels or containers employed to contain liquefied gases to reduce evaporation thereof, and particularly to thermal insulation for a liquid hydrogen flight tank.

A tank designed to contain liquid hydrogen, for example, requires very effective thermal insulation to reduce the rate of evaporation to an acceptable minimum value. The extremely low boiling temperature, high vapor pressure and low volumetric heat of vaporization of liquid hydrogen impose severe requirements on the physical, mechanical and thermal properties of the insulation employed. Moreover, in the case of thermal insulation for a liquid hydrogen flight tank, the insulation is required to perform well thermally and mechanically under all of the conditions encountered during the prelaunch, boost and space flight periods of service.

Thermal insulation materials generally used at temperatures above those at which air liquefies cannot be used with satisfactory results to thermally insulate liquid hydrogen systems. This is the case because the very low boiling temperature of liquid hydrogen, which is in excess of 100° F. lower than the boiling temperature of liquid air, causes air trapped in the thermal insulation materials employed, to condense and solidify in the pores or interstices of the insulation material. This phenomena, in turn, results in a marked decrease in thermal insulation characteristics, mechanical injury to the insulation material because of freezing phenomena and ultimate failure of the insulation due to an increased rate of continuous liquefaction of air.

In an effort to overcome these difficulties, it has generally been the practice to purge such thermal insulation materials with very low-temperature condensing gases, such as helium, when they are used to insulate liquid hydrogen systems. This method has not been entirely successful. It also entails the use of sealing means with the insulating material to seal out air and moisture. The provision of satisfactory, durable sealing means at the cryogenic temperatures of liquid hydrogen requires the solution of difficult practical problems and involves extremely high manufacturing and maintenance costs.

Vacuum jackets also have been used to thermally insulate liquid hydrogen systems. The use of vacuum jackets is, however, very objectionable because of the very high manufacturing and maintenance costs involved in such use. Also, vacuum jackets are relatively heavy and their use on a liquid hydrogen flight tank, for example, results in severe airborne weight penalties.

Accordingly it is an important object of this invention to provide efficient thermal insulation for a cryogenic liquid system, which insulation does not involve the use of vacuum jackets.

Another object of this invention is to provide efficient thermal insulating material having highly satisfactory physical, mechanical and thermal properties at very low temperatures.

A further object of this invention is to provide efficient flight tank thermal insulating material free of vacuum jackets and the need for purging with cryogenic gases, which is capable of performing well thermally and mechanically under all of the conditions encountered during the periods of prelaunch, boost and flight in space.

Still another object of this invention is to provide such thermal insulating material for use with liquid hydrogen systems, which material is characterized by being substantially free of difficulties produced by condensation of liquid air in the insulation material.

Additional objects will become apparent from the following description of the invention, which is given primarily for purposes of illustration, and not limitation.

Stated in general terms, the objects of this invention are attained by providing thermal insulating material comprising a first layer of insulation around the container, ordinarily metal, or other system to be insulated, which is adapted to prevent condensation of air on the walls of the container or system. Generally this first layer of insulation by itself will not afford sufficient thermal insulation to prevent excessive evaporation of a cryogenic liquid such as liquid hydrogen, for example. This first layer of insulation can be a material such as cork, corkboard, closed cell polyurethane foam, foam-filled honeycomb, rubber, elastomers, resins, fluorocarbon resins, etc., generally characterized by being tough and elastic, or resilient, and relatively impervious to air, moisture, etc., both in the gaseous and liquid forms. That is, although the material of this first layer may be cellular or porous, the cells or pores should be closed and not continuous, but rather discontinuous, to render the material porous but impervious.

To prevent excessive loss of the cryogenic liquid, a second layer of insulation is provided over the first layer. This second layer can be a material such as glass cloth, glass fiber matting, flexible polyurethane foam, and the like, generally characterized by being porous with continuous pores rather than discontinuous pores, or cells of porous lightweight, meshed, fibrous, flexible, low density properties and exhibiting to air, moisture, etc., relatively pervious characteristics. A sufficient thickness of this second layer of insulation is used to reduce the heat transfer rate into the cryogenic system or container to the level compatible with the thermal insulating properties of the first layer of insulation, described in the paragraph above, to achieve the desired degree of overall thermal insulation without condensing air on the exposed surfaces of the system or container. The relative thicknesses of the first layer of insulation to that of the second layer is balanced in each case so that air condensation is prevented and the heating or evaporation of cryogenic liquids in the system or container is kept well below predetermined practical limits.

The resulting combination of first and second layers of insulation is covered by a thin, strong protective shroud adapted to hold the layers of insulation in place and to protect the insulation from any dangerous elements in its environment. This shroud can be made of a sheet or film of resins, such as polyester film, a sheet of metal, such as aluminum sheet, for example, or a combination of sheets of resin and metal. The shroud is suitably apertured, perforated, unsealed, or open-ended so that air has free access to the two combined layers of insulation, i.e., the first and second insulation materials, described hereinabove.

A more detailed description of a specific embodiment of the invention is given below with reference to the attached drawing which is a partial sectional view, showing structural details of upper and lower portions of the side walls, and portions of the top and bottom walls, of a liquid hydrogen flight tank thermally insulated in accordance with the invention.

The tank wall 10 is made of open-ended, generally cylindrical shape, and is provided with a dished top, or upper dome 11, and a dished bottom, or lower dome 12. The upper and lower domes 11 and 12 are welded to the inside of tank wall 10, as indicated at 13 and 14 respectively, to form an enclosed, pressure-tight aluminum tank. Auxilary hardware, such as inlet and outlet conduits and valves, relief valves, etc., are not shown, to simplify the drawing and the description.

A relatively thin layer of corkboard 16, which is airtight, or impervious, is mounted around the outside of tank wall 10, and preferably is bonded directly thereto by the use of a suitable bonding agent, such as a commercially available adhesive. An alternative method of bonding the corkboard to the outside of the tank wall is the use of a layer of fiber glass cloth or equivalent material between the tank wall and the corkboard bonded to each by adhesive. Preferred adhesives are epoxy resin adhesives in general. Among the commercially available adhesives found suitable are those known as Armstrong Epoxy Resin cement numbers A-4, A-6, 820 and 826 made by the Armstrong Adhesives Company of Goshen, Indiana. The layer of corkboard 16 is sealed to render it additionally impervious to air and moisture. The cork layer is sealed by bonding a layer of plastic material over it, such as Teflon or Mylar. This layer is bonded by suitable rubber base adhesives or cements available commercially. A suitable adhesive is that sold under the name of "Pliobond" and manufactured by the Goodyear Tire and Rubber Company of Akron, Ohio.

In this manner, air is prevented from coming freely in contact with the cold tank wall 10 of a cryogenic container. Similar layers of corkboard 17 and 18 are fitted over upper dome 11 and lower dome 12, respectively, and preferably are similarly bonded and sealed. The thickness of corkboard layers 16, 17 and 18 are chosen so that they provide at least sufficient thermal insulation to the liquid hydrogen-containing flight tank to maintain its outer surface temperature above about −317° F. and preferably at about −300° F., which is the temperature at which oxygen liquefies. Air completely liquefies at about −317° F. at atmospheric pressure, while liquid hydrogen, inside the tank boils at about −423° F. at atmospheric pressure. Thus a temperature differential of at least about 106° F., and preferably 123° F., is maintained between the inside of the liquid hydrogen tank and the outside surfaces of corkboard layers 16, 17 and 18.

A layer, or blanket, of glass fiber matting 20, which is pervious to air and moisture, is mounted around the outside of the layer of corkboard 16. The outer layers of fiberglass and aluminum are wrapped around the tank without necessarily being sealed with adhesive. They may be tied in place, secured by studs attached to the cork, or held by other suitable mechanical means. Similar layers of glass fiber matting 21 and 22 are fitted over the layers of corkboard 17 and 18, respectively, on upper dome 11 and lower dome 12, respectively. The interstices of the layers of glass fiber matting 20, 21 and 22, while the liquid hydrogen flight tank is on the surface of the earth, are filled with air.

The ratio of the thickness of the glass fiber matting 20, 21 and 22 to the respective thickness of the corkboard 16, 17 and 18, preferably should be such that the temperature at the surface of the corkboard is maintained slightly above about −317° F., such as at −300° F., (the approximate boiling temperature of liquid air at atmospheric pressure) as stated hereinabove, so that the rate of vaporization of liquid hydrogen is maintained within predetermined desired limits. Actual tests show that this ratio should preferably be within the range of from about 10:1 to 1:1, a preferred range is from about 1:1 to about 4:1 and a preferred ratio for commonly occuring conditions is 1.5:1. The ratio used will be somewhat dependent upon the requirements of the situation.

An example of a tank and thermal insulation structure includes a tank having a wall 10 of about 0.1 inch thickness, and a total thickness of insulation of about 0.25 inch consisting of impervious and pervious layers 16 and 20 each of about equal thickness.

A shroud 23 of sheet aluminum or similar metal is mounted around the layer of glass fiber matting 20. This is done with the aid of an aluminum retainer ring 24 attached to the outside upper portion of tank wall 10, by riveting or welding, to retain or clamp the upper end of shroud 23 against glass fiber matting 20, corkboard 16 and tank wall 10. The lower end of shroud 23 is unattached for free circulation of air through fiber glass matting 20. To additionally aid such free circulation of air, retainer ring 24 can be apertured or perforated at regularly spaced intervals over its entire area. By virtue of such free circulation of air, the glass fiber matting 20 of the flight tank insulation continuously vents itself to the changing ambient pressure during vehicle ascent, and equilibrates itself to a vacuum environment in outer space. Thus the problems associated with sealed vacuum jackets, or sealed, helium purged, insulating jackets, are eliminated.

As an alternative to the use of glass fiber matting 20, described above for the second layer, or pervious layer, of thermal insulation, a composite blanket, or layer, made up of alternate sheets of aluminum foil and glass fiber matting, or glass cloth, can be used. The use of a plurality of sheets of aluminum foil has the important added advantage in space of reflecting radiant heat radiated by the sun, away from the tank wall and the liquid hydrogen contents of the tank. The aluminum foil acts as multi-layer radiation shielding. The composite blanket, or layer, of sheets of aluminum foil and glass fiber matting, or glass cloth, is assembled and held together as a unit by stitching the plurality of sheets together between single plys of glass cloth. The resulting pervious composite layer 20 can be bonded to the shroud 23 by suitable adhesive, or cement.

Complex, or uneven, surfaces of the flight tank wall 10 are covered with granulated cork, or foamed-in-place plastic foams, such as foamed polyurethane foams, plus adhesive or suitable cement.

It should be noted that the level of the liquid hydrogen, or other cryogenic liquid, does not, in actual practice, extend up to any areas of the tank wall 10 which are not thermally insulated, as for example, the area between the upper ends of the combined first and second layers of thermal insulation 16, and 20, and shroud 23, and the area where the shroud 23 is sealed by retainer ring 24, to the tank wall 10.

Obviously, many other modifications and variations of the cryogenic liquid container, or system, thermal insulation of the present invention are possible in the light of the teachings given hereinabove. It is, therefore, to be understood that, within the scope of the appended claims, the invention can be practiced otherwise than as specifically described.

What is claimed is:
1. A thermally insulated liquid hydrogen container for a launch vehicle comprising:
   a tank for containing said liquid hydrogen;
   a first layer of insulating air-impervious material attached to the walls of said tank, the inner surface of said tank being subjected to the temperature of liquid hydrogen; and
   a second layer of insulating air-pervious material attached to and covering said first layer and in communication with the ambient air, the ratio of the thickness of said first layer to the thickness of said second layer being such that the temperature at the interface of said layers is just above the condensation temperature of oxygen.

2. A thermally insulated liquid hydrogen container, as set forth in claim 1, wherein said ratio of the thickness of said first layer to the thickness of said second layer is such that the temperature at the interface of said layers is maintained at about −300° F.

3. Thermal insulation, as set forth in claim 1, wherein the ratio of the thickness of said second layer to the thickness of the first layer is in the range from 10:1 to 1:1.

4. Thermal insulation, as set forth in claim 1, wherein the ratio of the thickness of said second layer to the thickness of the first layer is in the range from 4:1 to 1:1.

5. Thermal insulation, as set forth in claim 1, wherein the ratio of the thickness of said second layer to the thickness of the first layer is in the range from 1.5:1 to 1:1.

References Cited by the Examiner

UNITED STATES PATENTS

| 662,217 | 11/1900 | Brady | 220—9 |
| 1,436,298 | 11/1922 | Spicer | 220—10 |
| 1,918,335 | 7/1933 | Heylandt | 220—9 |
| 2,206,680 | 7/1940 | Sitton | 220—9 |
| 2,639,593 | 5/1953 | Deutgen | 220—9 |

THERON E. CONDON, *Primary Examiner.*

GEORGE O. RALSTON, LOUIS G. MANCENE,
*Examiners.*